United States Patent
Shmiel et al.

(10) Patent No.: US 9,448,992 B2
(45) Date of Patent: Sep. 20, 2016

(54) NATURAL LANGUAGE SEARCH RESULTS FOR INTENT QUERIES

(71) Applicant: GOOGLE INC., Mountain View, CA (US)

(72) Inventors: Tomer Shmiel, Ramat Gan (IL); Dvir Keysar, Herzliya (IL); Yonatan Erez, Tel Aviv (IL)

(73) Assignee: Google Inc., Mountain View, CA (US)

(*) Notice: Subject to any disclaimer, the term of this patent is extended or adjusted under 35 U.S.C. 154(b) by 468 days.

(21) Appl. No.: 13/910,031

(22) Filed: Jun. 4, 2013

(65) Prior Publication Data
US 2014/0358889 A1    Dec. 4, 2014

(51) Int. Cl.
*G06F 17/30* (2006.01)
*G06F 17/27* (2006.01)

(52) U.S. Cl.
CPC ..... *G06F 17/2745* (2013.01); *G06F 17/30654* (2013.01)

(58) Field of Classification Search
CPC ................ G06F 12/2745; G06F 17/30654; G06F 17/30684
USPC ............. 707/708, 710, 737, 738; 704/9, 10
See application file for complete search history.

(56) References Cited

U.S. PATENT DOCUMENTS

| | | | |
|---|---|---|---|
| 7,774,328 B2 | 8/2010 | Hogue et al. | |
| 8,078,573 B2 | 12/2011 | Betz | |
| 2006/0047637 A1* | 3/2006 | Meyerzon et al. | 707/3 |
| 2012/0078888 A1* | 3/2012 | Brown et al. | 707/723 |

FOREIGN PATENT DOCUMENTS

WO    2010/105214 A2    9/2010

OTHER PUBLICATIONS

International Search Report and Written Opinion for PCT Patent Application No. PCT/US2014/039354, mailed on Sep. 22, 2014, 11 pages.
Lee et al., "SiteQ: Engineering High Performance QA system Using Lexico-Semantic Pattern Matching and Shallow NLP", available online at <http://trec.nist.gov/pubs/trec10/papers/SiteQ_trec10.pdf>, Nov. 13, 2001, 10 pages.
Itakura et al., "University of Waterloo at INEX 2009: Ad Hoc, Book, Entity Ranking, and Link-the-Wiki Tracks", Dec. 7, 2009, pp. 331-341.

* cited by examiner

*Primary Examiner* — Hares Jami
(74) *Attorney, Agent, or Firm* — Brake Hughes Bellermann LLP (57) ABSTRACT

Systems and methods provide natural language search results to clear-intent queries. To provide the natural language search results, a system may parse a document from an authoritative source to generate at least one heading-text pair, the text appearing under the heading in the document. The system may assign a topic and a question category to the heading-text pair and store the heading-text pair in a data store keyed by the topic and the question category. The system determines that a query corresponds to the topic and the question category, and provides the heading-text pair as a natural language search result for the query. In some implementations, the text portion of the heading-text pair may be a paragraph or a list of items and the natural language search result may be provided with conventional snippet-based search results in response to the query.

21 Claims, 8 Drawing Sheets

Symptoms of Mono

The most common symptoms of mono are high fever, a severe sore throat, swollen glands and tonsils, weakness, and fatigue. Symptoms usually start 4 to 6 weeks . . .
read full answer on webmd.com Signs and symptoms of mononucleosis may include:
- Fatigue
- General feeling of unwellness (malaise)
- Sore throat, perhaps a strep throat that doesn't get better . . .

read full answer on mayoclinic.com

— 205

The initial symptoms of mono are
- Fatigue
- General feeling of unwellness (malaise)
- Sore throat, perhaps a strep throat that doesn't get better . . .

Read full answer on medicinenet.com — 215

— 210

Mononucleosis (Mono) Symptoms: Fatigue, Aches, & More – WebMD
www.webmd.com/a-to-z.../understanding-mononucleosis-symptoms
Mar 30, 2013 – Could you have mononucleosis? Read about the symptoms of mono from experts at WebMD Mononucleosis – Symptoms, Diagnosis, Treatment of Mononucleosis ...
Health.nytimes.com > Times Health Guide > ...
May 15, 2012 – Back to Top Symptoms. Mono may begin slowly with fatigue, a general ill feeling, headache, and a sore throat. The sore....

Mononucleosis: Symptoms – MayoClinic.com
Www.mayoclinic.com > ... > Mononucleosis > Basics
Signs and symptoms such as fever and sore throat usually lessen within a couple of weeks, although fatigue, enlarged lymph nodes and a swollen ...

NATURAL LANGUAGE SEARCH RESULTS FOR INTENT QUERIES

BACKGROUND

Search engines are a popular method of discovering information. Traditionally, search engines crawl documents in a corpus, generate an inverted index for the documents, and use the index to determine which documents are responsive to a search query. Search results commonly include a title from a responsive document and a snippet of text from the document that includes one or more of the search terms in the query. Such snippets are not natural language results and typically fail to provide a complete, easily understood answer to non-factual questions where there is no one correct answer. While a user can select the link associated with the snippet to view the context of the snippet in the original document to determine whether the identified information is adequate, this slows the user experience and involves additional effort on the part of the user to receive an answer to a non-factual question.

SUMMARY

Some implementations enable a search system to provide enhanced search results to natural language and non-factual queries. The search system may enable a query requestor to receive relevant answers in an intuitive format without having to load and read the original document source. A natural language query is a query using terms a person would use to ask a question, such as "how do I make hummus?" Some natural language queries are non-factual. A non-factual query may be a query that includes a request for specific information about a topic. The specific information is considered the question category and can have the same format for questions directed to various topics. For example, in a cooking context a query requestor may have a question about making toffee. Recipe instructions are the specific information requested for the topic of toffee and the instructions may include diverse or complex information. In some implementations, the search system may perform offline processing of authoritative sources to determine and store answers to common clear-intent non-factual questions. The search system may identify clear-intent queries and match the queries to the stored answers and provide an enhanced search result with complete answers from one or more authoritative sources.

One aspect of the disclosure can be embodied in a computer-implemented method that includes parsing, using at least one processor, documents from authoritative sources to generate heading-text pairs. For each heading-text pair, the method also includes, associating, using the at least one processor, the heading-text pair with a first intent template of a plurality of intent templates, the first intent template having an associated question category, determining a topic and a question category for the heading-text pair based on the first intent template, and storing the heading-text pair in a data store keyed by topic and question category. The method may also include determining that a query corresponds to a second intent template of the plurality of intent templates, the second intent template having an associated second question category, determining a second topic for the query based on the second intent template, retrieving heading-text pairs from the data store that have a topic and question category key that correspond with the second topic and the second question category, and providing a search result for the query, wherein the search result includes at least one of the retrieved heading-text pairs.

The method can include one or more of the following features. For example, the second intent template can include one non-variable portion and one variable portion. In such an implementation, corresponding the query to the second intent template can include determining that the query includes a first term that corresponds to the one non-variable portion, determining that a second term in the query aligns with the variable portion, and determining that the second term in the query corresponds to a topic in the data store. As another example, corresponding the query to the second intent template can include generating potential templates from terms of the query and determining whether one of the potential templates corresponds to the second intent template. In some implementations associating the heading-text pair with the first intent template includes determining that text of the heading corresponds to a non-variable portion of the first intent template and the topic is derived from text of the heading that corresponds with a variable portion of the first intent template.

In some implementations, the method can further include generating the plurality of intent templates by obtaining intent questions from authoritative sources, generating potential templates from the intent questions, determining a frequency of occurrence for each unique potential template, selecting a predetermined number of most frequently occurring potential templates, and storing the selected potential templates in a memory as the plurality of intent templates. In such implementations, the potential templates are first potential templates and generating the plurality of intent templates can further include obtaining second intent questions from search records, generating second potential templates from the second intent questions, and including the second potential templates with the first potential templates in the determining, selecting, and storing. Also in such implementations, each potential template may have at least one non-variable portion and a variable portion, the variable portion representing a starting location of a topic in text that corresponds to the non-variable portion of the potential template. Accordingly generating the plurality of intent templates can include assigning a respective question category to each selected potential template based on the non-variable portion of the selected potential template.

Another aspect the disclosure can be embodied in a computer system that includes at least one processor and memory storing instructions that, when executed by the at least one processor, cause the computer system to perform operations. The operations include parsing a document from an authoritative source to generate at least one heading-text pair, the text appearing under the heading in the document and assigning a topic and a question category to the heading-text pair. The operations also include storing the heading-text pair in a data store keyed by the topic and the question category, determining that a query corresponds to the topic and the question category, and providing the heading-text pair as a natural language search result for the query. A text portion of the heading-text pair may be a paragraph or a list of items that appears in the original document from the authoritative source.

The system can include one or more of the following features. For example, the operations may include generating snippet-based search results by searching an index of documents for documents responsive to the query, and providing the snippet-based search results with the natural language search result. In such an implementation, the snippet-based results can be ranked using a particular ranking algorithm, and the heading-text pairs are ranked using the same ranking algorithm As another example, the operations may also include retrieving a plurality of heading-text pairs from the data store, each heading-text pair being keyed by the topic and the question category, ranking the plurality of heading-text pairs, and selecting a predetermined number of highest ranked heading-text pairs for the search result. In such an implementation, the plurality of heading-text pairs may be ranked based on a length of the text portion of the heading-text pair or on a similarity of the text portion with text portions of other heading-text pairs in the plurality of heading-text pairs or a combination of these.

As another example, the system may further include memory storing a plurality of intent templates and wherein the heading-text pair is generated when the heading conforms to one of the plurality of intent templates. In such an implementation, the question category may be determined by the intent template the heading conforms to. In some implementations, generating the heading-text pair includes determining a topic from a context of the heading in the document; and adding the topic to a heading portion of the heading-text pair.

Another aspect of the disclosure can be embodied in a computer system that includes at least one processor and memory storing instructions that, when executed by the at least one processor, cause the computer system to perform operations. The operations may include parsing documents from authoritative sources to generate a plurality of heading-text pairs, generating a set of potential templates from the heading-text pairs, determining a quantity of occurrences for at least some of the set of potential templates, and storing potential templates with highest quantities as intent templates in a memory of the computer system.

The system can include one or more of the following features. For example, converting the heading to potential templates may include replacing subsets of consecutive terms in the heading with a variable portion. As another example, the set of potential templates is a first set of potential templates and the operations further include determining, using search records, previously issued queries that have search results associated with the authoritative sources, generating a second set of potential templates from the determined queries, and including the second set of potential templates with the first set of potential templates as part of determining the quantity of occurrences. In some implementations, the operations include assigning a question category to the intent templates, the question category being stored as an attribute of the intent template.

In one implementation, the operations include receiving a natural language query and determining an intent template of the intent templates that corresponds to the natural language query, the determined intent template having an associated question category. The operations may further include determining a topic for the natural language query using the determined intent template, searching an index of documents for documents responsive to the topic and the associated question category, and providing a search result to for the natural language query that includes the documents responsive to the topic and the associated question category.

Another aspect of the disclosure can be embodied on a computer-readable medium having recorded and embodied thereon instructions that, when executed by a processor of a computer system, cause the computer system to perform any of the methods disclosed herein.

One or more of the implementations of the subject matter described herein can be implemented so as to realize one or more of the following advantages. As one example, the system may provide natural language answers to a query. Natural language answers are answers in a paragraph and/or list format that provide diverse or complex answers or more than one fact per answer. The natural language answers are of high quality because they are derived from authoritative sources. Also, because the answers are natural language answers, the query requestor can view and compare complete answers quickly and effortlessly among two or more authoritative sources. Furthermore because the natural language answers provide diverse or complex answers, the user has increased confidence that the authoritative source document has a sought-for answer, even if only the beginning of the answer is provided in the search result. In some implementations, the natural language responses may be included prior to snippet-type search results, making the answers easy and intuitive to locate. In some implementations, a snippet-type search result may be removed if duplicative of one of the natural language results provided, thus automatically paring down the search results provided to the query requestor.

As another example, natural language queries may have much lower search volume, compared to keyword queries. The improved search system can identify the intent of a natural language query and, thus, provide high quality answers that a conventional search engine may miss or may not rank highly in response to the natural language query. In some implementations, the search system may convert a natural language query to a keyword query to improve the quality of snippet-based results returned for the natural language query.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
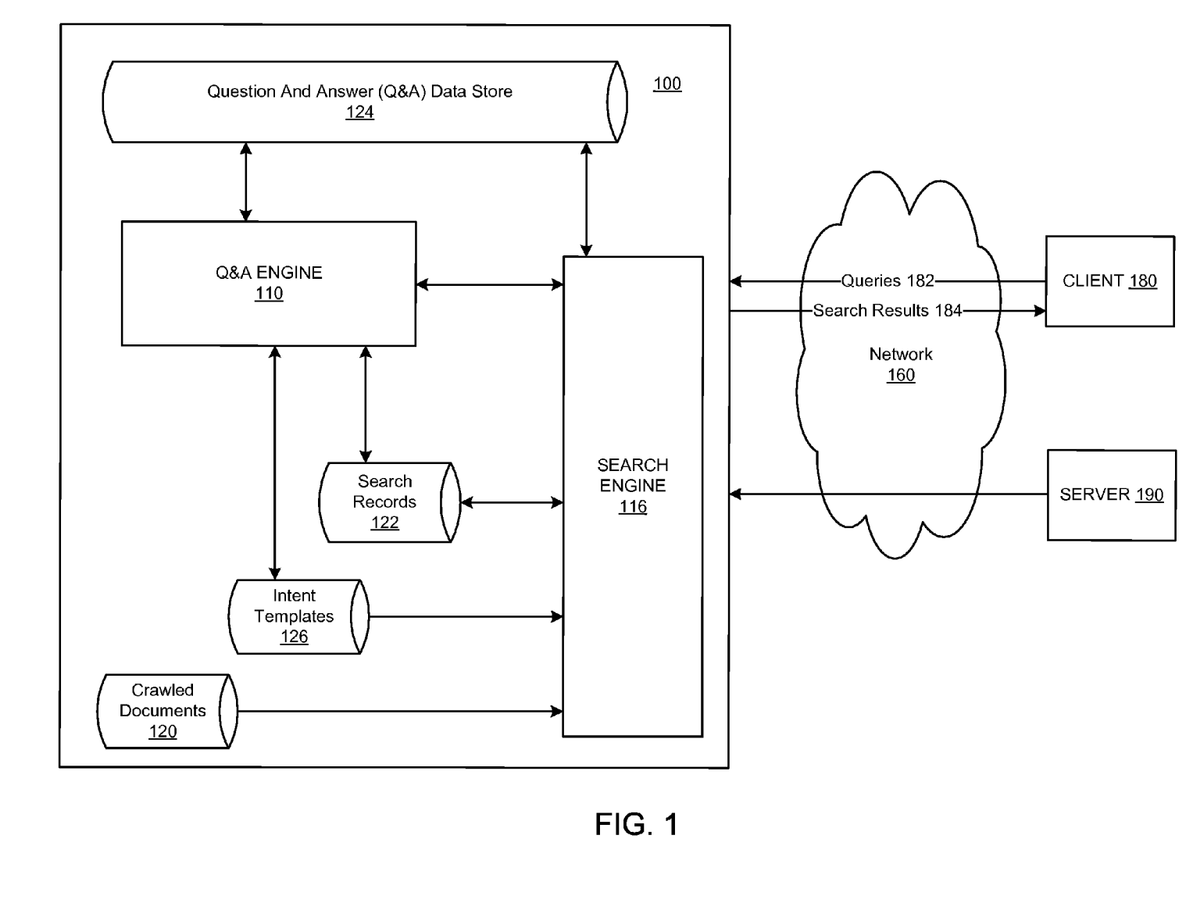
FIG. 1 illustrates an example system in accordance with some implementations.

FIG. 1 is a block diagram of a system 100 in accordance with an example implementation. The system 100 may be used to implement a search engine that provides natural language answers to queries that include a question with identifiable intent. The depiction of system 100 in FIG. 1 is described as a system capable of searching authoritative sources available over the Internet to generate a question-and-answer (Q&A) data store that provides the natural language answers. The system may provide intent templates used to identify queries with clear intent questions and to identify the natural language answers from the content of the authoritative sources. Other configurations and applications of the described technology may be used. For example, the system may include other methods of classifying the text from the authoritative sources or identifying clear-intent questions. As another example, natural language answers may be provided for other corpora, such as intranets, libraries, or other document repositories. In some implementations the natural language answer may replace a snippet-based search result provided for the corresponding authoritative source.

Figure 9:
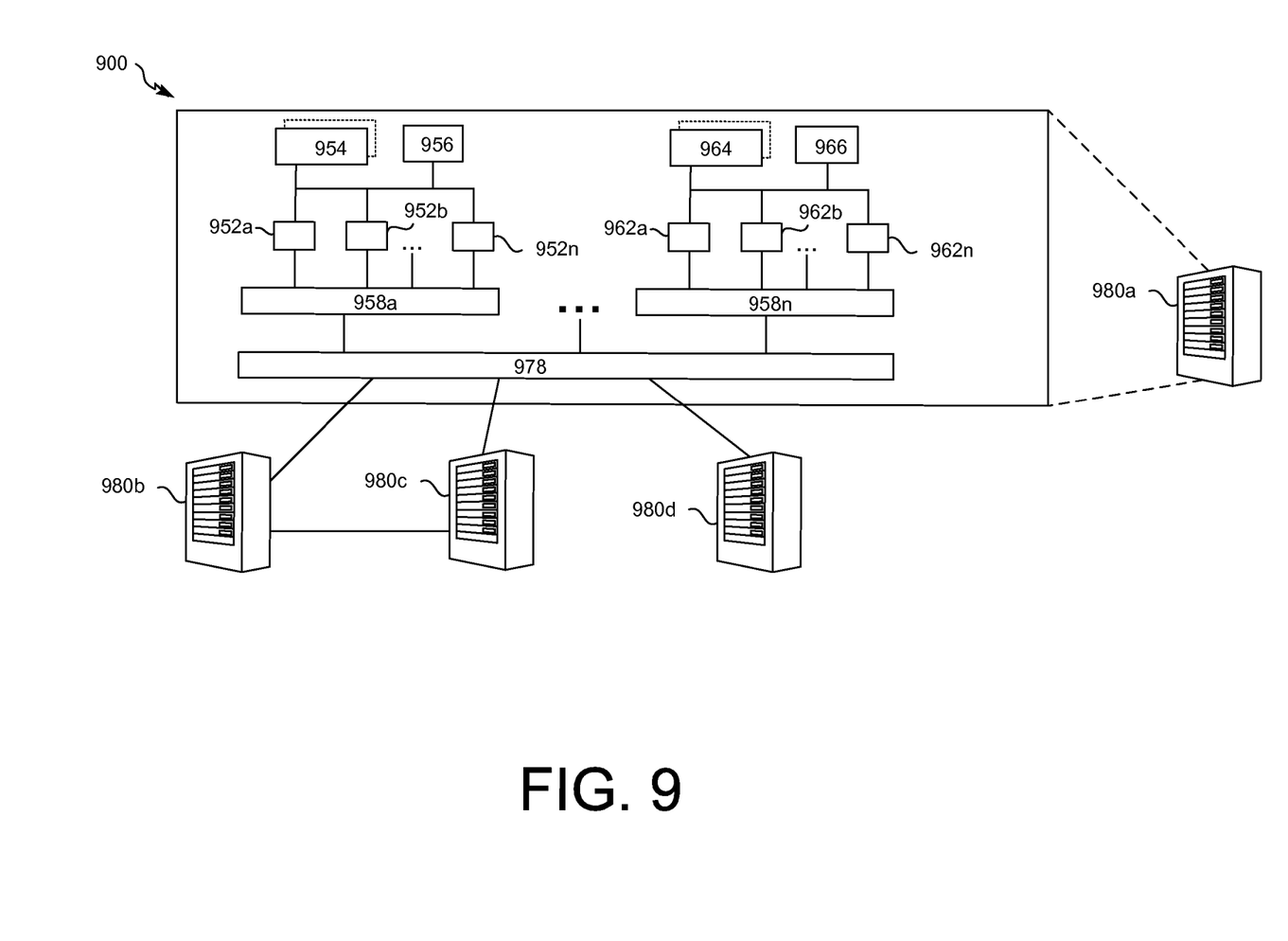
FIG. 9 shows an example of a distributed computer device that can be used to implement the described techniques.

The search system 100 may receive queries 182 from a client device 180 and return search results 184 in response to the queries. Each query 182 is a request for information. Query 182 can be, for example, text, audio, images, or scroll commands. The system 100 may include search engine 116 and Question-And-Answer (Q&A) engine 110. System 100 may be a computing device that takes the form of a number of different devices, for example a standard server, a group of such servers, or a rack server system. In some implementations, Q&A engine 110 and search engine 116 may each be a separate computing device, or they may share components such as processors and memories. For example, the Q&A engine 110 and the search engine 116 may be implemented in a personal computer, for example a laptop computer. In some implementations, the Q&A engine 110 and the search engine 116 may be distributed systems implemented in a series of computing devices, such as a group of servers. The system 100 may be an example of computer device 900, as depicted in FIG. 9.

The system 100 may include a Question-And-Answer (Q&A) data store 124. The Q&A data store 124 may include text collected from one or more authoritative sources, for example one or more of server 190, that has been assigned a topic and a question category. The text may be stored in data store 124 as it appears in the original document, for example in the form of one or more paragraphs or a list of items. Accordingly, the text may represent multiple facts that can be determined from the paragraph(s) or list. The Q&A data store 124 may store the text keyed by topic and question category. The Q&A data store 124 may also include other information for the text, such as an identifier of a document the text appears in, a location, e.g. URL, for the document, metadata for the document, values and/or signals that assist in ranking the text, etc. The text stored in the Q&A data store 124 may have a heading portion and a text portion. In some implementations the Q&A data store 124 may include questions and answers for a variety of subject matter. For example, the Q&A data store 124 may store questions and answers for health-related questions, for hobby-related questions, for cooking-related questions, etc. In some implementations the topic and question category may be unique to a particular subject matter area. In some implementations, the Q&A data store 124 may also include an indication of subject matter for each topic and question category.

The search engine 116 may search the Q&A data store 124 in addition to other document corpora in responding to a search request. For example, the search engine 116 may also be capable of searching a corpus of crawled documents 120 in addition to the Q&A data store 124. Crawled documents 120 may include an index for searching for terms or phrases within a corpus of documents. In some implementations the corpus may be documents available on the Internet. Documents may include any type of file that stores content, such as sound files, video files, text documents, source code, news articles, blogs, web pages, PDF documents, spreadsheets, etc. In some implementations, crawled documents 120 may store one-dimensional posting lists that include phrases, terms, or document properties as posting list values and, for each posting list value, identifiers for documents related to the phrase or term. While an index for crawled documents 120 has been described as using posting lists, the index may have some other known or later developed format. In some implementations, the search results from crawled documents 120 may be used to generate intent templates, to determine whether a query includes a clear-intent question, to determine a question category for a query, etc.

The system 100 may also include search records 122. Search records 122 may include search logs, aggregated data gathered from queries, or other data regarding the search terms and search results of previously processed queries. Certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

In some implementations, the search records 122 may be generated by search engine 116 in the normal process of generating search results 184. The Q&A data store 124, crawled documents 120, and search records 122 are stored on tangible computer-readable storage devices, for instance disk, flash, cache memory, main memory, or a combination of these, configured to store data in a semi-permanent or non-transient form. In some implementations Q&A data store 124, crawled documents 120, and search records 122 may be stored in a combination of various memories.

In some implementations, the system 100 may include an indexing engine (not shown) that includes one or more processors configured to execute one or more machine executable instructions or pieces of software, firmware, or a combination thereof to create and maintain Q&A data store 124 and/or crawled documents 120, etc. The indexing engine may obtain content from, for example, one or more servers 190, and use the content to maintain crawled documents 120. In some implementations, the servers 190 may be web servers, servers on a private network, or other document sources that are accessible by the indexing engine.

The search engine 116 may include one or more computing devices that use the Q&A data store 124 and/or crawled documents 120 to determine search results 184 for queries 182. Search results from crawled documents 120 may be determined, for example, using conventional or other information retrieval techniques and represent conventional snippet-based results. Search results from the Q&A data store 124 represent natural language results. Search engine 116 may include one or more servers that receive queries 182 from a requestor, such as client 180, and provide search results 184 to the requestor. Search results 184 may include snippet information from documents responsive to the query and information from the Q&A data store 124. For example, the search engine 116 may include a ranking engine that identifies documents responsive to the query from crawled documents 120, identifies answers in Q&A data store 124 responsive to the query and calculates scores for the documents and answers responsive to the query, for example, using one or more ranking signals. The ranking engine may rank the documents and answers found responsive to the query using the scores.

The system 100 may also include a Q&A engine 110. The Q&A engine 110 may include one or more computing devices that include one or more processors configured to execute machine executable instructions or pieces of software, firmware, or a combination thereof. The Q&A engine 110 may share a computing device or devices with the search engine 116, or may operate using one or more separate computing devices. The Q&A engine 110 may use the Q&A data store 124, the search records 122, and the crawled documents 120 to generate intent templates 126, to populate and maintain the Q&A data store 124, and to determine if a query includes a clear-intent question that can be answered by the Q&A data store 124. For example, the search engine 116 may send a query to the Q&A engine 110 and the Q&A engine 110 may provide natural language answers from Q&A data store 124 to the search engine 116, as appropriate. The natural language answers may be ranked by the Q&A engine 110 or by the search engine 116 using data provided by the Q&A engine.

The Q&A engine 110 may populate and maintain Q&A data store 124 by determining heading-text pairs found in documents from the authoritative sources. An authoritative source may be a source that is identified by a system administrator as authoritative, a source that is popular and trusted, for example as determined by frequent selection of the source in search results, or a source that consistently ranks high in search results for queries dealing in the subject matter of the Q&A data store 124. The Q&A engine 110 may parse documents associated with an authoritative source from the crawled documents 120 or the Q&A engine 110 may include a web crawler that collects documents and related information from the authoritative sources. In one implementation, the authoritative sources may be identified by a domain name, a Uniform Resource Locator (URL) or a Uniform Resource Identifier (URI). As is known, all web pages and documents associated with the domain may be considered from the authoritative source. Documents from the authoritative source may be considered authoritative documents.

In some implementations, the Q&A engine 110 may use intent templates 126 to populate and maintain the Q&A data store 124 and evaluate query information from the search engine 116. The templates 126 may be derived from content available from authoritative sources and from previously processed queries and their returned results. Each template 126 may include a non-variable portion and a variable portion. The non-variable portion may be text and the variable portion may be a placeholder for one or more words. For example, a template of "$X causes" has a non-variable portion of "causes" preceded by a variable portion. As another example, a template of "recipe for $X" has a non-variable portion of "recipe for" followed by a variable portion. A query or heading that corresponds to or matches the template includes any number of words followed by the word "causes", for example "diabetes causes" or "heart attack causes." The portion that matches the variable portion, for example "diabetes" or "heart attack" for a template of "$X causes" or "split pea soup" for a template of "recipe for $X" may be considered a topic of the query or heading.

Each of the templates 126 may be assigned to a question category that represents a variety of questions used to request the same specific information. For example, the templates "how do I treat $X", "$X treatment", "how is $X treated", and "how to cure $X" may all be templates for a treatment question category. Likewise, the templates "how to make $X," "$X recipe," and "directions for making $X" may all be templates for a recipe question category. These questions may be assigned to the question category manually or automatically through similarity of search results returned for queries conforming to the template. For example, if the search results for a query of "how is diabetes treated" and "what cures diabetes" are similar, the Q&A engine 110 may cluster the two templates "how is $X treated" and "what cures $X" together under the treatment question category.

The search system 100 may be in communication with the client(s) 180 and/or servers 190 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the search engine 116 may communicate with and transmit data to/from clients 180. For example, search engine 116 may transmit search results or suggested updates to one or more of clients 180.

Figure 2:
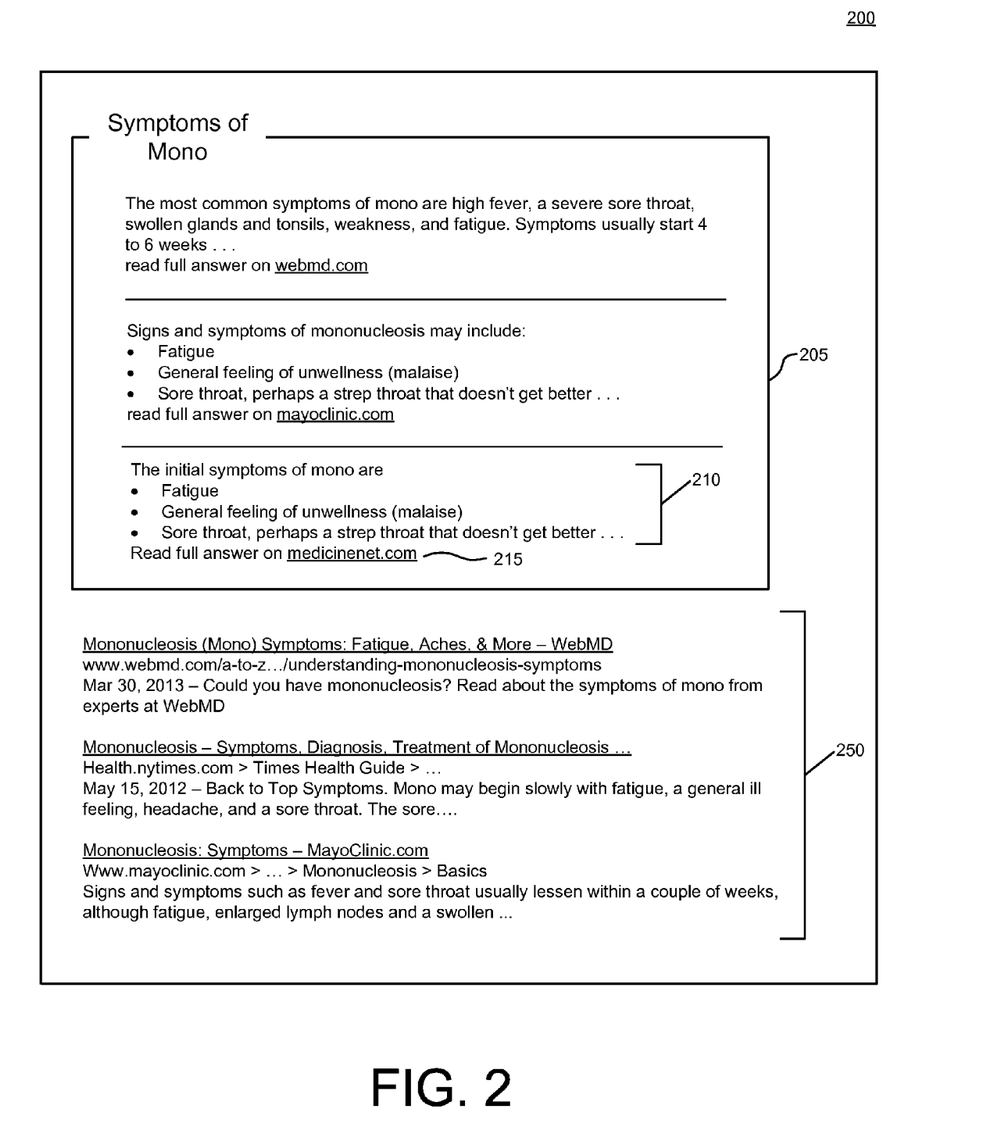
FIG. 2 illustrates an example of a user interface showing enhanced search results that include natural language answers, consistent with disclosed implementations.

FIG. 2 illustrates an example of a user interface 200 showing enhanced search results that include natural language answers, consistent with disclosed implementations. A search system, such as system 100 of FIG. 1, may generate the user interface 200 in response to a query such as "what are the symptoms of mono" or "mononucleosis symptoms." In the example of FIG. 2, the enhanced search results may include natural language answers 205, which have been gathered from authoritative sources. In the example of FIG. 2, the natural language answers 205 appear ahead of snippet-based search results 250, but they could be interspersed with the snippet-based search results, to the right or left of snippet-based search results, in a pop-up window, etc. As illustrated in user interface 200, the natural language answers 205 may include a text portion 210 that allows a query requestor to see text that directly answers the query. The natural language answers 205 may also include a link 215 that allows the query requestor to determine the source of the text portion 210 and to navigate to the source document in the authoritative source if more information or context is desired. In some implementations, the natural language answers 205 may be selected as the highest ranking answers of a set of possible answers. In some implementations, the ranking algorithm used to rank the snippet-based search results 250 may also be used to rank the natural language results 205.

In some implementations, the natural language answers 205 include answers from sources or documents that do not appear in the snippet-based search results 250. For example, if the user issues a natural language query, the snippet-based results 250 may have been selected from the documents, for example crawled documents 120, based on a keyword level search while the natural language answers 205 are based on the intent of the natural language query. In some implementations, the search system may use intent templates, described in more detail below, to translate the natural language query into a keyword query and the keyword query may be used to determine the snippet-based results 250.

Figure 3:
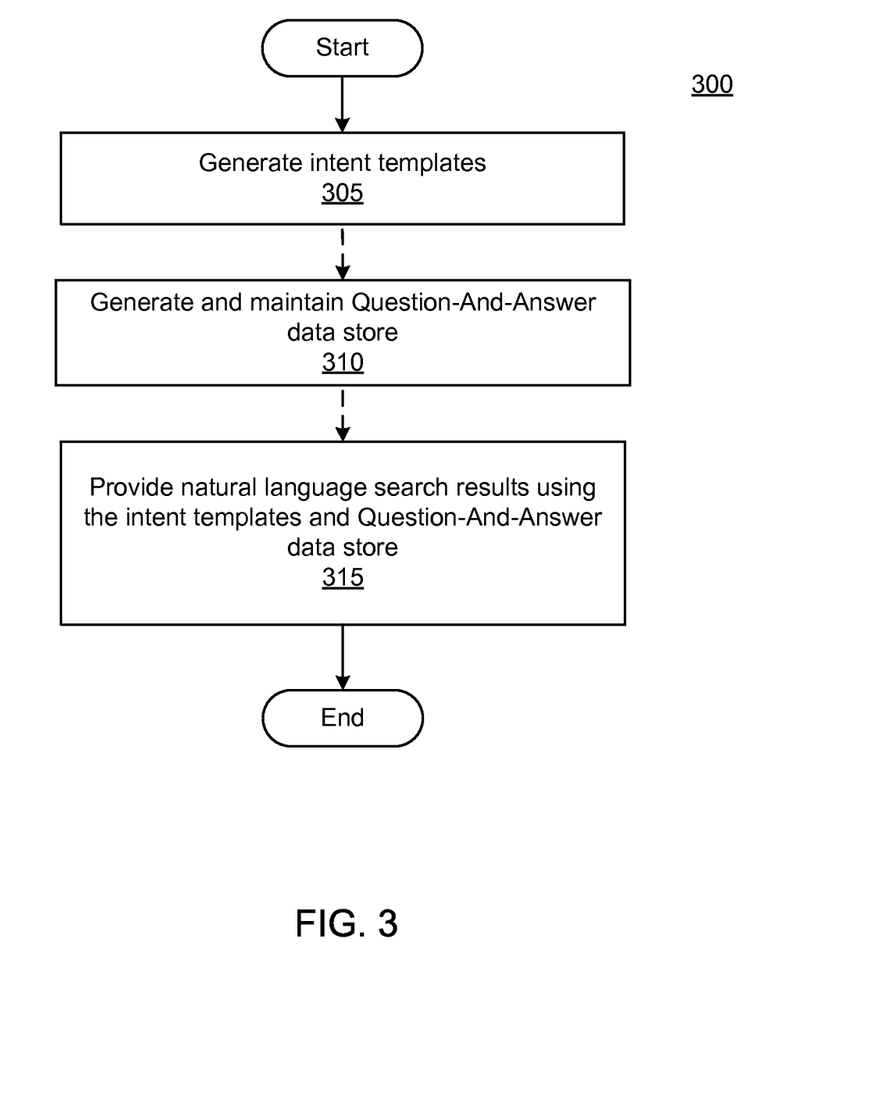
FIG. 3 illustrates a flow diagram of an example process for providing search results enhanced with natural language answers, consistent with disclosed implementations.

FIG. 3 illustrates a flow diagram of an example process 300 for providing search results enhanced with natural language answers, consistent with disclosed implementations. The process 300 may be performed by a search system, such as system 100 of FIG. 1. Once the search system has established a Q&A data store, the search system may perform the steps of process 300 independently of each other. In other words, the search system may generate new intent templates independently of generating entries in the Q&A data store. The search system may also respond to queries using the Q&A data store concurrently with generating entries in the Q&A data store.

Process 300 may begin with the search system generating intent templates (305). This step may be optional if the search system uses some other means of identifying queries with clear-intent questions and identifying information used to populate the Q&A data store. In some implementations, the search system may perform step 305 periodically, for example once a week or once a month, to determine whether new templates can be added. The search system may also generate and maintain the Q&A data store (310) by parsing documents from the authoritative sources, collecting pairs in the form <heading, text> from the document content, endeavoring to assign a respective topic and question category to each of the heading-text pairs, and storing the heading-text pair in the Q&A data store by topic and question category. In some implementations, the search system may perform step 310 periodically, for example daily or weekly. In some implementations the period may depend on the subject matter. For example, medical information may be relatively stable, so that step 310 may be performed less frequently for medical authoritative sources than, for example, cooking authoritative source which may have content that changes more frequently. The search system may also use the Q&A data store and, in some implementations, the intent templates to provide natural language search results in response to a query that includes a clear-intent question (315). The search system may perform step 315 as-requested, so that the Q&A data store is continuously or nearly-continuously available to respond to queries.

Figure 4:
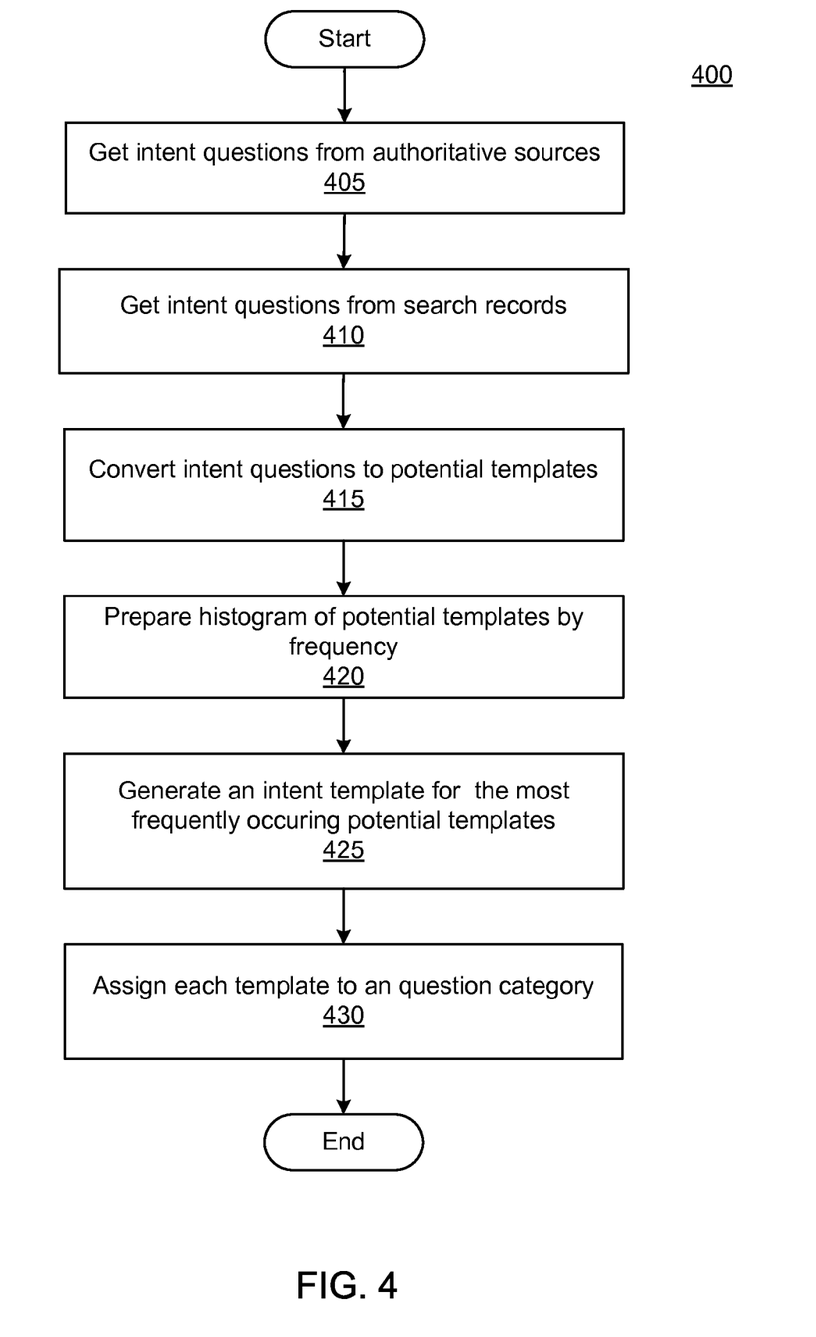
FIG. 4 illustrates a flow diagram of an example process for generating intent templates, consistent with disclosed implementations.

FIG. 4 illustrates a flow diagram of an example process 400 for generating intent templates, consistent with disclosed implementations. A search system, such as search system 100 of FIG. 1, may perform process 400 as part of step 305 of FIG. 3. It is understood that some of the steps illustrated in FIG. 4 are optional, and implementations need not perform each step, or may perform the steps in a different order.

Process 400 may begin with the search system obtaining possible intent questions from authoritative sources (405). The authoritative sources may be manually identified or may be automatically selected. Authoritative sources may include for example, general sources and focused sources. As an example, the domains webmd.com, mayoclinic.com, and medicinenet.com may be general authoritative sources for medical subject matter and the domains cancer.org and heart.org may be focused authoritative sources for medical subject matter. Similarly, allrecipes.com and foodnetwork.com may be general authoritative sources for cooking subject matter and vegetariantimes.com may be a focused authoritative source for cooking subject matter. Intent questions may be identified from headings in the content of documents associated with the authoritative sources. In web pages, for example, headings may be assumed to include intent questions and the search system may identify headings by mark-up language tags, by a larger font size, or some other type of formatting.

In some implementations, the search system may also obtain potential intent questions from search records (410). Search records may include search logs, aggregated data gathered from queries, or other data regarding the search terms and search results of previously processed queries. From the search records the search system may identify queries that relate to the subject matter of the Q&A data store. For example, the search system may identify queries having search results that include the authoritative sources in a position of prominence in the search results. For example, if the subject matter is medical information the search system may look for query results with documents from mayoclinic.com or webmd.com in the top ranking search results. The search system may then assume that the query associated with such identified search results includes a clear-intent question. By looking for clear-intent questions from queries as well as from authoritative sources, the search system may account for the various ways an intent question can be posed. For example, "heart disease treatment" and "how do I treat heart disease?" both represent the same intent question, but an authoritative source may be more likely to include the former while a query may be more likely to include the latter.

The search system may convert the potential intent questions to potential intent templates (415). For example, the search system may replace subsets of consecutive terms in the intent question with a variable or placeholder, such as $X. For example, "how diabetes is treated" may yield the potential templates of "how diabetes is treated", "how $X", "how diabetes $X", "how diabetes is $X", "$X treated", "$X is treated", "$X diabetes is treated", "how $X treated", "how $X is treated", and "how diabetes $X treated". As another example, "How to make hummus" may yield the potential templates of "how to make hummus", "how $X", "how to $X", "how to make $X", "how $X make hummus", "how $X hummus", "$X hummus", "$X make hummus", etc. Of course, it is understood that in some implementations not every possible potential intent template need be generated. For example, the search system may not include question words, e.g., who, what, how, when, where, etc., in the consecutive terms replaced by the placeholder.

The search system may determine the potential templates that occur most frequently across the documents and/or the queries associated with the authoritative sources (420). In one implementation, the search system may generate a histogram of the potential templates generated in step 415. The search system may select the potential templates appearing most frequently as intent templates (425). In some implementations, the search system may select a predetermined number of the potential templates. In some implementations, the search system may select all templates that occur a predetermined number of times. In some implementations, the search system may use a combination of a minimum number of templates and a minimum number of occurrences.

The search system may then associate each intent template generated with a question category (430). The question category clusters like-templates together. Thus, all templates relating to treatment or cure for a disease or condition may be clustered together using the same question category. In some implementations there may be hundreds of question categories. In some implementations, the assignment of a question category may be manual. For example, the search system may present the intent templates to a user who selects a question category for each intent template. In other implementations, the assignment may be automatic. For example, the search system may issue a query using the intent template, the query replacing the variable portion with a topic relevant to the subject matter. For instance, if the subject matter is medical related, the topic may be a disease, drug, or condition name. The search system may issue the queries using the same topic to replace the variable portion in each intent template. The search system may then compare the search results returned for each intent template. Templates that result in similar search results may be clustered together and the intent templates in the cluster may be assigned a question category. In some implementations, the search system may use a combination of automatic and manual question category assignment, so that templates with a minimum degree of similarity between search results are assigned the same question category, and those that fail to reach a minimum degree of similarity with other intent templates are manually assigned a question category by a user. The search system may store the intent templates and their respective question categories in a data store. Once the search system establishes intent templates, process 400 ends. Because intent templates do not change rapidly, the search system need not repeat process 400 frequently, but it may be beneficial to repeat it periodically. In some implementations, the search system may generate thousands of intent templates.

Figure 5:
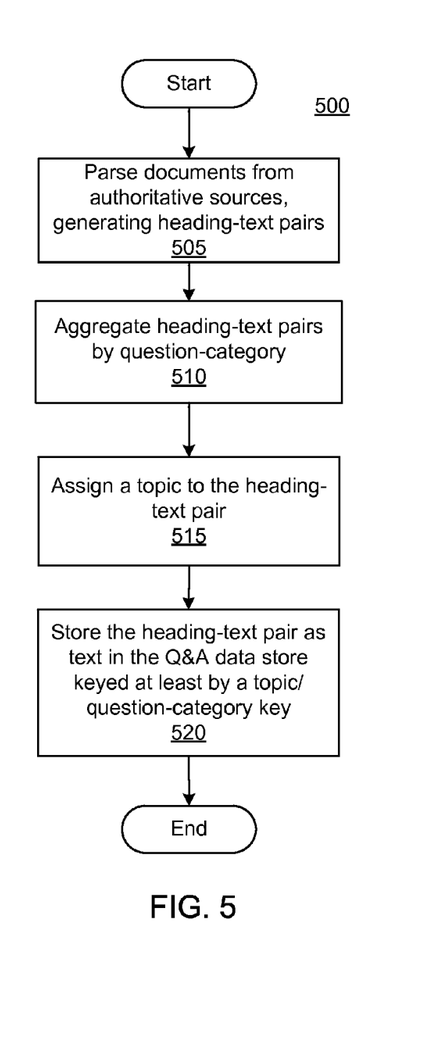
FIG. 5 illustrates a flow diagram of an example process for generating a Question-And-Answer data store for providing natural language answers, consistent with disclosed implementations.

FIG. 5 illustrates a flow diagram of an example process 500 for generating a Q&A data store for providing natural language answers to queries, consistent with disclosed implementations. A search system, such as search system 100 of FIG. 1, may perform process 500 as part of step 310 of FIG. 3. Process 500 may begin by parsing documents associated with authoritative sources, resulting in the generation of heading-text pairs (505). For example, the search system may search document contents from the authoritative sources for headings, as described above with regard to step 405 of FIG. 4. When a heading is located, the heading and the text associated with the heading may be captured as a heading-text pair. The heading-text pair may include the heading from the document content as a heading portion and, for example, the text appearing in the content of the document after the heading as the text portion. The text portion may be paragraphs that follow the heading, a list of items that follow the heading, or a combination of these. In some implementations, the text that appears after one heading and before another heading may be the text portion of the heading-text pair. In some implementations, a user may manually mark headings and the text to be associated with the headings. This may be useful for authoritative content that changes infrequently that does not conform to the heading-text pair identification described above.

In some implementations, only headings that exhibit a clear intent question may be stored in a heading-text pair. For example, the headings may be matched against or correspond with intent templates to determine whether the headings match an intent template. For example, the heading "Cancer symptoms" may correspond with an intent template of "$X symptoms" and the heading "Truffle Recipe" may correspond with an intent template of "$X Recipe." The variable portion of an intent template, e.g. $X, may represent one or more words. Thus, for example, "heart disease symptoms" also matches the intent template of "$X symptoms" and "Chocolate Cake Recipe" may correspond with an intent template of "$X Recipe."

The search system may aggregate the heading-text pairs identified in the authoritative sources by question category (510). In some implementations, the search system may use intent templates to aggregate the heading-text pairs. For example, as explained above, the search system may attempt to match a heading portion to an intent template. If a match is found, the heading-text pair may be assigned the question category that is assigned to the matching intent template. The search system may aggregate the heading-text pairs by assigned question category. In some implementations, the search system may cluster the heading portions without using intent templates by using other clustering methods, such as similarity of search results when the heading is used as a query.

The search system may assign a topic to the heading-text pair (515). The topic may represent the specific focus of the question or heading. In a medical subject area, the topics may represent various diseases, injuries, drugs, or conditions. In some implementations, the search system may use the intent templates to assign a topic. For example, the variable portion of an intent template that matches the heading may be used to determine the topic for the heading-text pair. Thus, a heading of "initial symptoms of mono," which matches an intent template of "symptoms of $X", may be assigned a topic of 'mono" and a heading of "pepperoni pizza ingredients," which corresponds to a template of "$X ingredients", may be assigned a topic of "pepperoni pizza."

In some implementations, the topic may not be included in the heading. For example, the heading may simply state "treatment" or "causes". Such a heading-text pair may be considered ambiguous. In such a situation, the system may use the context of the heading to determine a topic. For example, in some implementations, the dominant terms from a document in which the heading appears may be determined and the topic may be selected from the dominant terms. For example, the search system may compare the dominant terms in a document to the topics associated with other heading-text pairs in the same question category as the ambiguous heading-text pair. If a dominant term corresponds to a topic of other heading-text pairs with the same question category as the ambiguous heading-text pair, the search system may associate the ambiguous heading-text pair with the matching topic. In some implementations the uniform resource locator of a document may be used to determine the topic. For example, some authoritative sources use the name of a disease as part of the URL. The search system may compare portions of the URL with topics assigned to other heading-text pairs in the same question category as the ambiguous heading-text pair. If a topic match is found, the system may assign the ambiguous heading-text pair to the matching topic. Other methods of using context, such as semantic analysis, may be used to determine a topic for an ambiguous heading-text pair.

The search system may then store the heading-text pair in the Q&A data store, keyed by the assigned topic and question category (520). The Q&A data store may store the heading-text pair as text that can be offered as a natural language answer to a query that includes an intent question with the same topic and question category as the heading-text pair. The Q&A data store may also include other information for the heading-text pair, such as a URL or other identifier of the document from which the heading-text pair was pulled, metadata and other information used to rank the heading-text pair, etc. The search system may repeat steps 515 and 520 for each heading-text pair that was identified in the documents associated with the authoritative sources and assigned a question category. In some implementations, the Q&A data store may include tens of thousands of entries.

Figure 6:
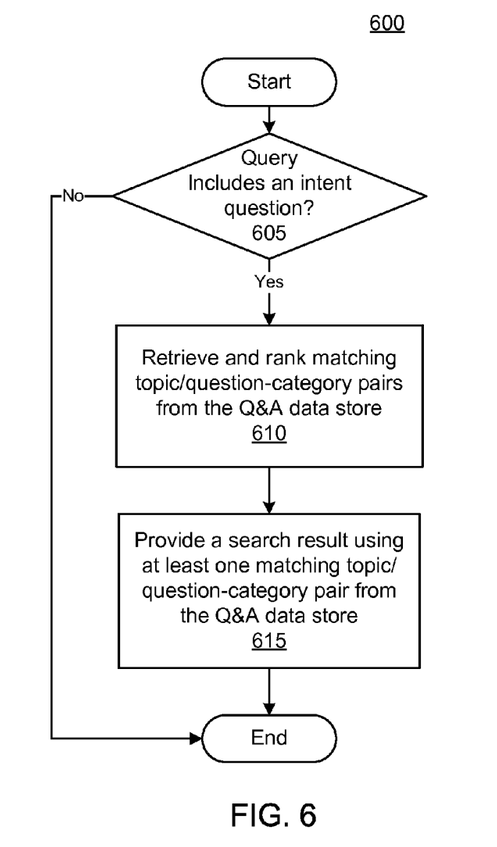
FIG. 6 illustrates a flow diagram of an example process for using the Question-And-Answer data store to provide an answer to a query, consistent with disclosed implementations.

FIG. 6 illustrates a flow diagram of an example process 600 for using the Q&A data store to provide an answer to a query, consistent with disclosed implementations. A search system, such as search system 100 of FIG. 1, may perform process 600 as part of step 315 of FIG. 3. For example, the search system may receive a query from a query requestor and may perform process 600 in addition to, or instead of, a process that searches indexed documents and generates snippet-based search results for the query. Process 600 may begin by determining whether the query includes a clear-intent question (605). When a query can be matched to a topic/question category key in the Q&A data store, it includes a clear-intent question. In some implementations, determining whether the query includes a clear-intent question may involve using intent templates, as explained in more detail below with regard to FIG. 7. In some implementations determining whether the query includes a clear-intent question may involve analyzing the search results for a query. For example, the search system may compare top-ranked search results for the query with top-ranked search results of a query that includes the topic and question category of records in the Q&A data store. For example, the search system may determine that the query includes the term "cancer" and that cancer is a topic stored in the Q&A data store. For each unique question category in the Q&A data store paired with cancer topic, the search system may issue a query that includes the topic and question category. The search results returned may be compared to the search results of the query. If the two results are similar enough, e.g., meet a similarity threshold, the system may determine that the query includes a clear-intent question that matches the topic and question category. If the query does not include a clear-intent question (605, No), process 600 ends without providing natural language answers for the query.

If the query does include a clear-intent question (605, Yes), the search system may retrieve records from the Q&A data store that match the topic/question category combination and rank the retrieved records (610). In some implementations, the search system may use a ranking method that mirrors the ranking method used to rank snippet-based search results. This may assure that top sources in the snippet-based search results, e.g., results 250 of FIG. 2, appear as top sources in the natural language results, e.g., natural language results 205 of FIG. 2. In some implementations, the ranking of natural language results, e.g., the records retrieved from the Q&A data store, may be ranked differently than search results from other sources. For example, the search system may rank shorter answers ahead of more lengthy answers, may rank answers with bullet points ahead of paragraph-form answers, may rank answers from focused authoritative sources ahead of answers from general authoritative sources when the focused source matches the topic of the query, etc. In some implementations, the Q&A data store records may include an indication of how much of the text is common to other text with the same topic/question category key. This may be a way for the search system to automatically determine which answers include consensus and are, therefore, better answers.

The search system may then select at least one of the ranked records retrieved from the Q&A data store to provide as a search result for the query (615). In some implementations, a predetermined number of the top-ranking records may be selected. In some implementations the search result includes a link to the source document in addition to the natural language text. In some implementations, the search system may remove duplicate documents from the snippet-based search results. For example, if a natural language result is provided for a particular document and a snippet-based result is also provided, the search system may remove the snippet-based result from the results provided to the query requestor.

In some implementations, the system may not provide natural language answers to a query that may otherwise be identified as a clear-intent query. For example, the query 'center of disease control and prevention' may match an intent template of '$X prevention' but the intent of this query differs from a query of 'diabetes prevention.' As another example, the query 'how to make money' may match an intent template of 'how to make $X' but the intent differs from a query of 'how to make pudding.' Thus, a system administrator may include the undesired queries in a blacklist, which can be stored in a memory of the search system. If the query corresponds to a blacklisted query, the search system may not perform process 600 for the query.

Figure 7:
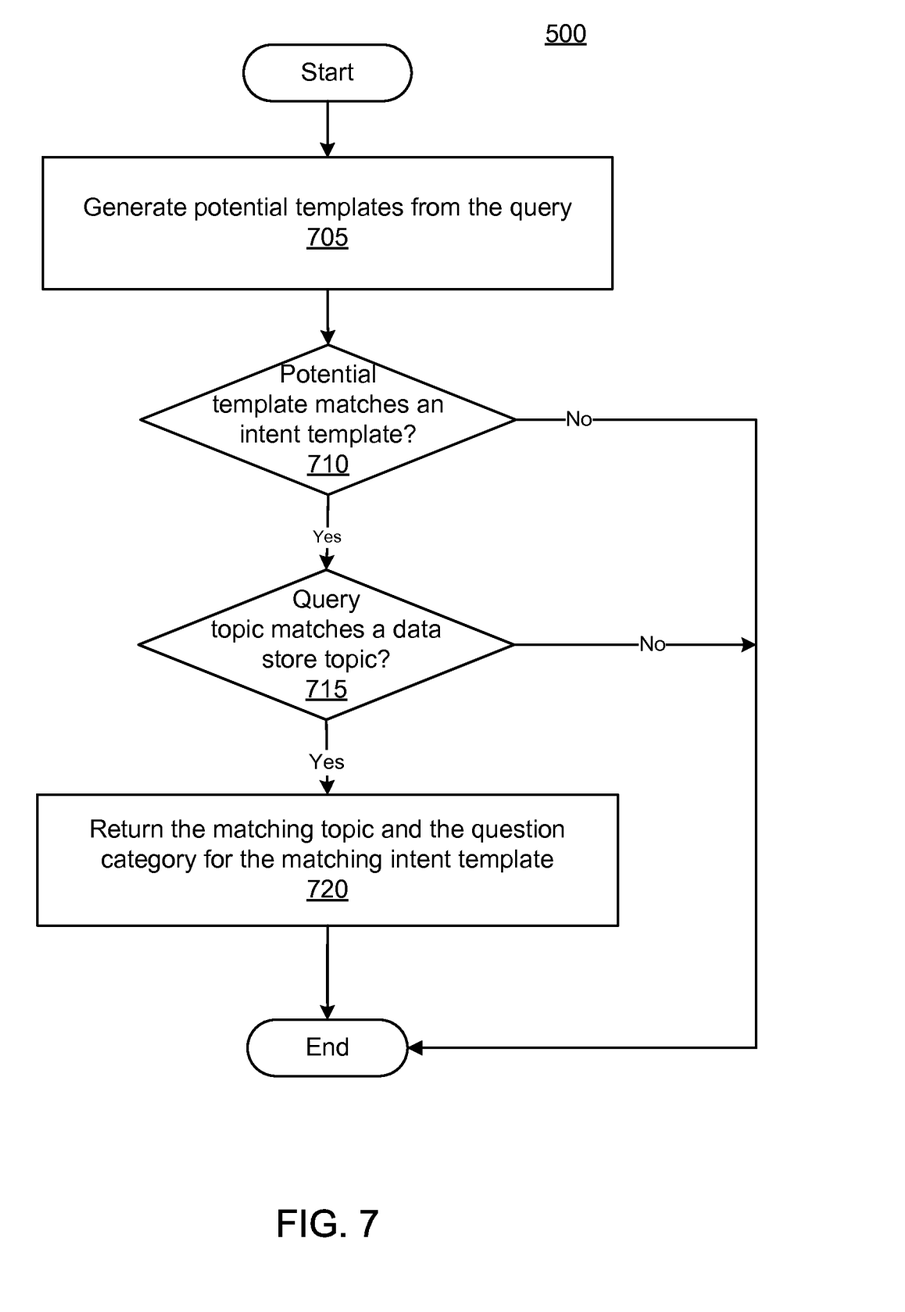
FIG. 7 illustrates a flow diagram of an example process for determining whether a query includes a clear-intent question, consistent with disclosed implementations.

FIG. 7 illustrates an example of a process 700 for determining whether a query includes an intent question, consistent with disclosed implementations. Process 700 may be performed by a search system as part of step 605 of FIG. 6. Process 700 may begin with the search system generating potential intent templates from the query (705), as explained in more detail above with regard to step 415 of FIG. 4. The search system may then determine whether any of the potential intent templates correspond to an intent template (710). If not (710, No), the query does not include an intent question and process 700 may end. If the query does correspond to an intent template (710, Yes), the search system may determine whether the query corresponds to any of the topics in the Q&A data store (715). For example, the portion of the query that maps to a variable portion of the intent template may be assumed to be the topic for the query. The search system may look at the Q&A data store to determine whether the combination of this topic and the question category assigned to the matching intent template appear as a key in the Q&A data store. If not (715, No), the query does not include an intent question and process 700 ends. If a matching topic is found (715, Yes), the search system may return the matching topic and the question category of the matching intent template, from step 710. The topic and question category may then be used to retrieve natural language answers from the Q&A data store, as described above with regard to FIG. 6.

In some implementations, process 700 may also be used to convert a natural language query to a keyword query to improve the snippet-based search results returned in response to the query. For example, if the search system determines that the natural language query includes a clear-intent question using process 700, the search system may use the corresponding topic and the question category to issue a new query in place of the natural language query. For example, the search system may use the topic and the question category to search an index of crawled documents for documents responsive to the topic and question category. The responsive documents may be used to generate snippet-based search results. Thus, process 700 may be used to generate higher-quality conventional search results for a natural language query, in addition to providing natural language results.

It is to be understood that while the examples above relate generally to topics and questions in the medical subject area, implementations are not limited to such applications. The methods, system, and techniques described above may be applied to any subject area where authoritative sources may be identified.

Figure 8:
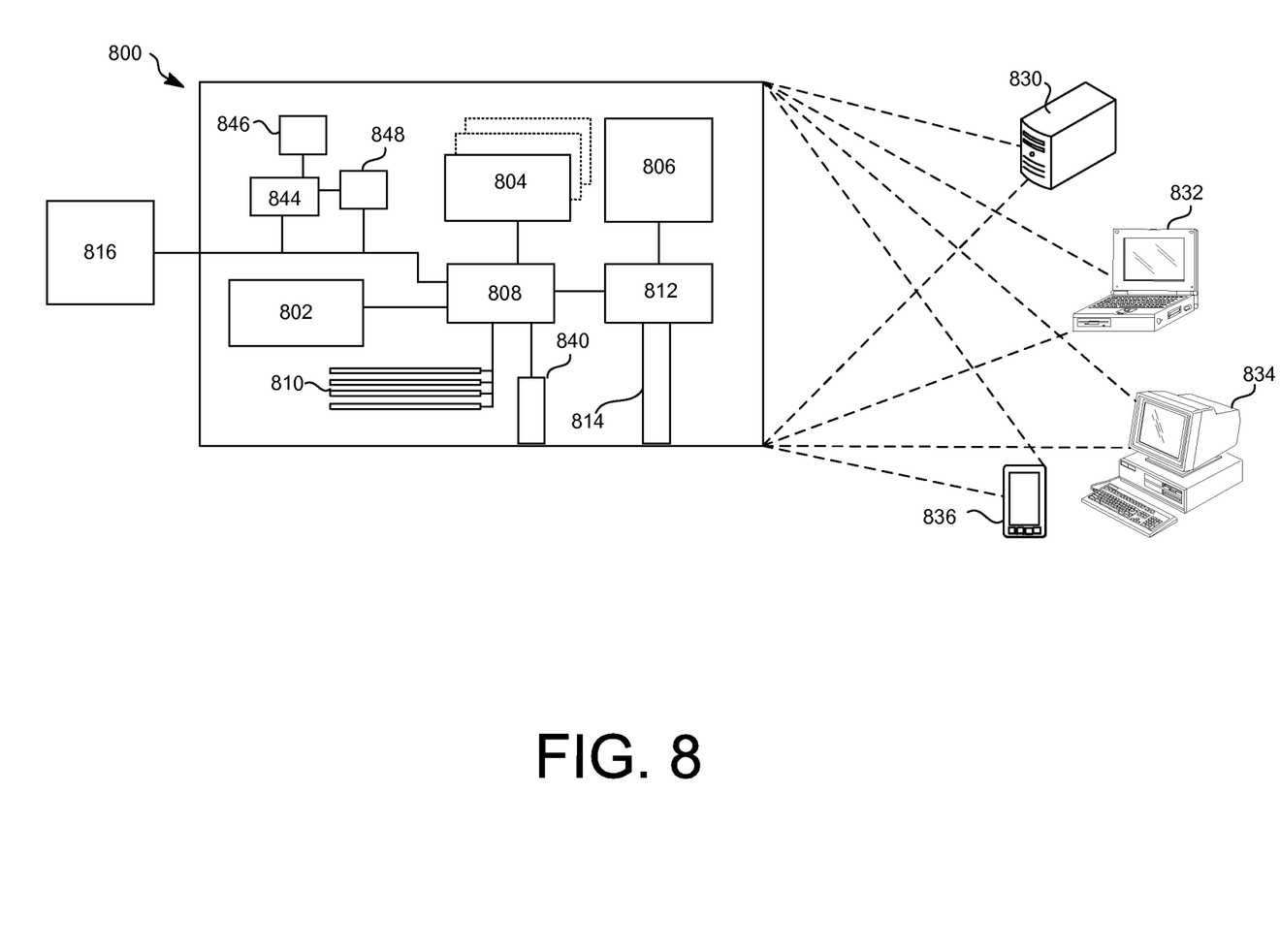
FIG. 8 shows an example of a computer device that can be used to implement the described techniques.

FIG. 8 shows an example of a generic computer device 800, which may be system 100, and/or client 180 of FIG. 1, which may be used with the techniques described here. Computing device 800 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a personal computer such as a laptop computer 822, or smart phone 836. An entire system may be made up of multiple computing devices 800 communicating with each other. Other configurations are possible.

FIG. 9 shows an example of a generic computer device 900, which may be system 100 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, which are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980b, 980c, and 980d, and these may collectively be known as system 100. As another example, system 100 of FIG. 1 may include one or more computing devices 900 as search engine 116. Furthermore, some of the computing devices may be located geographically close to each other, and others may be located geographically distant. The layout of system 900 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   parsing, using at least one processor, documents from authoritative sources to generate heading-text pairs, a heading-text pair being taken from document contents;
   for each heading-text pair:
      associating, using the at least one processor, the heading-text pair with an intent template of a plurality of intent templates, the associated intent template having an associated question category,
      determining a topic and a question category for the heading-text pair based on the associated intent template, and
      storing the heading-text pair in a data store keyed by topic and question category;
   determining that a query corresponds to a first intent template of the plurality of intent templates, the first intent template having a respective question category;
   determining a first topic for the query based on the first intent template;
   retrieving a heading-text pair from the data store that has a topic and question category key that corresponds with the first topic and respective question category; and
   providing a search result for the query, wherein the search result includes the retrieved heading-text pair.

2. The method of claim 1, wherein the first intent template includes one non-variable portion and one variable portion, and wherein corresponding the query to the first intent template includes:
   determining that the query includes a first term that corresponds to the one non-variable portion;
   determining that a second term in the query aligns with the variable portion; and
   determining that the second term in the query corresponds to a topic in the data store.

3. The method of claim 1, wherein corresponding the query to the first intent template includes:
   generating potential templates from terms of the query; and
   determining whether one of the potential templates corresponds to the first intent template.

4. The method of claim 1, further including generating the plurality of intent templates by:
   obtaining intent questions from authoritative sources;
   generating potential templates from the intent questions;
   determining a frequency of occurrence for each unique potential template;
   selecting a predetermined number of most frequently occurring potential templates; and
   storing the selected potential templates in a memory as the plurality of intent templates.

5. The method of claim 4, wherein each potential template has at least one non-variable portion and a variable portion, the variable portion representing a starting location of a topic in text that corresponds to the non-variable portion of the potential template.

6. The method of claim 5, wherein generating the plurality of intent templates includes assigning a respective question category to each selected potential template based on the non-variable portion of the selected potential template.

7. The method of claim 4, wherein the potential templates are first potential templates and generating the plurality of intent templates further includes:
- obtaining second intent questions from search records;
- generating second potential templates from the second intent questions; and
- including the second potential templates with the first potential templates in the determining, selecting, and storing.

8. The method of claim 1, wherein associating the heading-text pair with its associated intent template includes determining that text of the heading corresponds to a non-variable portion of the associated intent template and the topic is derived from text of the heading that corresponds with a variable portion of the associated intent template.

9. A computer system comprising:
- at least one processor; and
- memory storing instructions that, when executed by the at least one processor, cause the computer system to perform operations comprising:
  - parse a document from an authoritative source to generate at least one heading-text pair, the text appearing under the heading in the document,
  - assign a topic and a question category to the heading-text pair,
  - store the heading-text pair in a data store keyed by the topic and the question category,
  - determine that a query corresponds to the topic and the question category,
  - generate snippet-based search results by searching an index of documents for documents responsive to the query; and
  - provide the heading-text pair as a natural language search result for the query with the snippet-based search results.

10. The system of claim 9, wherein the memory further stores instructions that, when executed by the at least one processor, cause the computer system to:
- retrieve a plurality of heading-text pairs from the data store, each heading-text pair being keyed by the topic and the question category;
- rank the plurality of heading-text pairs; and
- select a predetermined number of highest ranked heading-text pairs for the search result.

11. The system of claim 9, wherein the snippet-based results are ranked using a particular ranking algorithm, and wherein the heading-text pairs are ranked using the particular ranking algorithm.

12. The system of claim 10, wherein the plurality of heading-text pairs are ranked based on a length of the text portion of the heading-text pair or on a similarity of the text portion with text portions of other heading-text pairs in the plurality of heading-text pairs.

13. The system of claim 9, wherein a text portion of the heading-text pair is a paragraph or a list of items.

14. The system of claim 9, further comprising memory storing a plurality of intent templates and wherein the heading-text pair is generated when the heading conforms to one of the plurality of intent templates.

15. The system of claim 14, wherein the question category is determined by the intent template the heading conforms to.

16. The system of claim 9, wherein generating the heading-text pair includes:
- determining a topic from a context of the heading in the document; and
- adding the topic to a heading portion of the heading-text pair.

17. A computer system comprising:
- at least one processor; and
- memory storing instructions that, when executed by the at least one processor, cause the computer system to perform operations comprising:
  - parsing documents from authoritative sources to generate a plurality of heading-text pairs, a heading-text pair being taken from document contents,
  - generating intent questions from the headings of the heading-text pairs,
  - generating a set of potential templates from the intent questions,
  - determining a quantity of occurrences for at least some of the set of potential templates,
  - storing a predetermined number of potential templates as intent templates in a memory of the computer system, wherein each intent template is assigned a respective question category,
  - parsing another document from the authoritative sources to generate a heading-text pair,
  - associating the heading-text pair with a first intent template of the intent templates,
  - determining a topic for the heading-text pair based on the first intent template, and
  - storing the heading-text pair in a data store keyed by topic and by the respective question category of the first intent template.

18. The computer system of claim 17, wherein generating an intent question from a heading includes replacing subsets of consecutive terms in the heading with a variable portion.

19. The computer system of claim 17, wherein the set of potential templates is a first set of potential templates and the memory stores instructions that, when executed by the at least one processor, cause the computer system to further perform operations including:
- determining, using search records, previously issued queries that have search results associated with the authoritative sources;
- generating a second set of potential templates from the determined queries; and
- including the second set of potential templates with the first set of potential templates when determining the quantity of occurrences.

20. The computer system of claim 18, wherein the question category assigned to an intent template is based on a non-variable portion of the intent question.

21. The computer system of claim 17, wherein the memory stores instructions that, when executed by the at least one processor, cause the computer system to further perform operations including:
- receiving a natural language query;
- determining an intent template of the intent templates that corresponds to the natural language query;
- determining a topic for the natural language query using the intent template;
- searching an index of documents for documents responsive to the topic and the associated question category; and
- providing a search result for the natural language query that includes the documents responsive to the topic and the associated question category.

* * * * *